United States Patent
Shigeoka et al.

(10) Patent No.: US 11,420,120 B2
(45) Date of Patent: *Aug. 23, 2022

(54) PROGRAM, INFORMATION PROCESSING APPARATUS, AND CONTROL METHOD FOR PROVIDING A STRATEGIC BATTLE GAME

(71) Applicant: GREE, Inc., Tokyo (JP)

(72) Inventors: Minenori Shigeoka, Tokyo (JP); Yuta Tanaka, Tokyo (JP); Yasuhiro Hayashida, Tokyo (JP)

(73) Assignee: GREE, INC., Tokyo (JP)

( * ) Notice: Subject to any disclaimer, the term of this patent is extended or adjusted under 35 U.S.C. 154(b) by 245 days.

This patent is subject to a terminal disclaimer.

(21) Appl. No.: 16/849,078

(22) Filed: Apr. 15, 2020

(65) Prior Publication Data
US 2020/0238173 A1 Jul. 30, 2020

Related U.S. Application Data

(63) Continuation of application No. 15/843,447, filed on Dec. 15, 2017, now Pat. No. 10,653,956.

(30) Foreign Application Priority Data

Feb. 7, 2017 (JP) .............................. JP2017-020320
Jun. 15, 2017 (JP) .............................. JP2017-118022

(51) Int. Cl.
*A63F 13/46* (2014.01)
*A63F 13/30* (2014.01)
*A63F 13/822* (2014.01)

(52) U.S. Cl.
CPC .............. *A63F 13/46* (2014.09); *A63F 13/30* (2014.09); *A63F 13/822* (2014.09)

(58) Field of Classification Search
None
See application file for complete search history.

(56) References Cited

U.S. PATENT DOCUMENTS

| | | | |
|---|---|---|---|
| 2015/0182864 | A1 | 7/2015 | Wada et al. |
| 2018/0071632 | A1 | 3/2018 | Takahashi et al. |
| 2018/0214767 | A1 | 8/2018 | Oh |

FOREIGN PATENT DOCUMENTS

| | | | |
|---|---|---|---|
| JP | 5600205 | B1 | 10/2014 |
| JP | 2015217296 | A | 12/2015 |

OTHER PUBLICATIONS

Japanese Office Action dated Jan. 22, 2019 in corresponding Japanese Application No. 2017-118022; 8 pages; Machine translation attached.

(Continued)

*Primary Examiner* — Robert T Clarke, Jr.
(74) *Attorney, Agent, or Firm* — Maier & Maier, PLLC

(57) ABSTRACT

A computer program product which may cause an information processing apparatus to execute steps of associating one group with each of a plurality of game media, arranging a plurality of game media on a field, starting a battle, arranging a first object associated with a plurality of parameters on the field according to a progress situation of the battle, executing a first change process of changing a parameter of the first object according to a control process of the game medium, stopping the executing of the first change process of the parameter if the parameter of the first object reaches the predetermined value, increasing points of the group corresponding to the parameter that has reached the predetermined value, and determining a result of the battle.

20 Claims, 12 Drawing Sheets

(56) References Cited

OTHER PUBLICATIONS

Shigehiro Okano, "League of Legends" Not to Get Confused by the Basic Rules and Technical Terms, AUTOMATON, Active Gaming Media, Feb. 13, 2015, URL https://automaton-media.com/articles/slr/super-lol-rocket-two-step/; 26 pages.

Japanese Office Action dated Jun. 26, 2018 of corresponding Application No. JP2017-118022; 6 pgs.

Office Action dated May 31, 2022, in connection with corresponding Japanese Application No. 2021-066983 (4 pp., including machine-generated English translation).

"Microsoft Age of Mythology", LOGiN Dec. 12, 2002, Enterbrain Co., Ltd., Dec. 1, 2002, vol. 21, Issue 12, pp. 104-107.

FIG.2

| USER ID | GROUP ID | INFORMATION ON OWNED GAME MEDIUM | INFORMATION ON USED GAME MEDIUM |
|---|---|---|---|
| *** | *** | *** | *** |
| *** | *** | *** | *** |
| ... | ... | ... | ... |

FIG.3

| GROUP ID | USER ID | GAME MEDIUM ID | LEVEL | PHYSICAL STRENGTH | ATTACK POWER | DEFENSE POWER | MOVEMENT RANGE | ATTACK RANGE | TYPE | INFORMATION ON GAME FUNCTION |
|---|---|---|---|---|---|---|---|---|---|---|
| A | *** | *** | *** | *** | *** | *** | *** | *** | *** | *** |
|  | : | : | : | : | : | : | : | : | : | : |
|  | *** | *** | *** | *** | *** | *** | *** | *** | *** | *** |
| B | *** | *** | *** | *** | *** | *** | *** | *** | *** | *** |
|  | : | : | : | : | : | : | : | : | : | : |
|  | *** | *** | *** | *** | *** | *** | *** | *** | *** | *** |
| C | *** | *** | *** | *** | *** | *** | *** | *** | *** | *** |
|  | : | : | : | : | : | : | : | : | : | : |
|  | *** | *** | *** | *** | *** | *** | *** | *** | *** | *** |

FIG.4

| OBJECT ID | DURABILITY PARAMETER | | | ACQUIRED POINT | TYPE |
|---|---|---|---|---|---|
| *** | GROUP A : *** | GROUP B : *** | GROUP C : *** | *** | BASE |
| *** | GROUP A : *** | GROUP B : *** | GROUP C : *** | *** | FORTRESS |
| ⋮ | ⋮ | ⋮ | ⋮ | ⋮ | ⋮ |

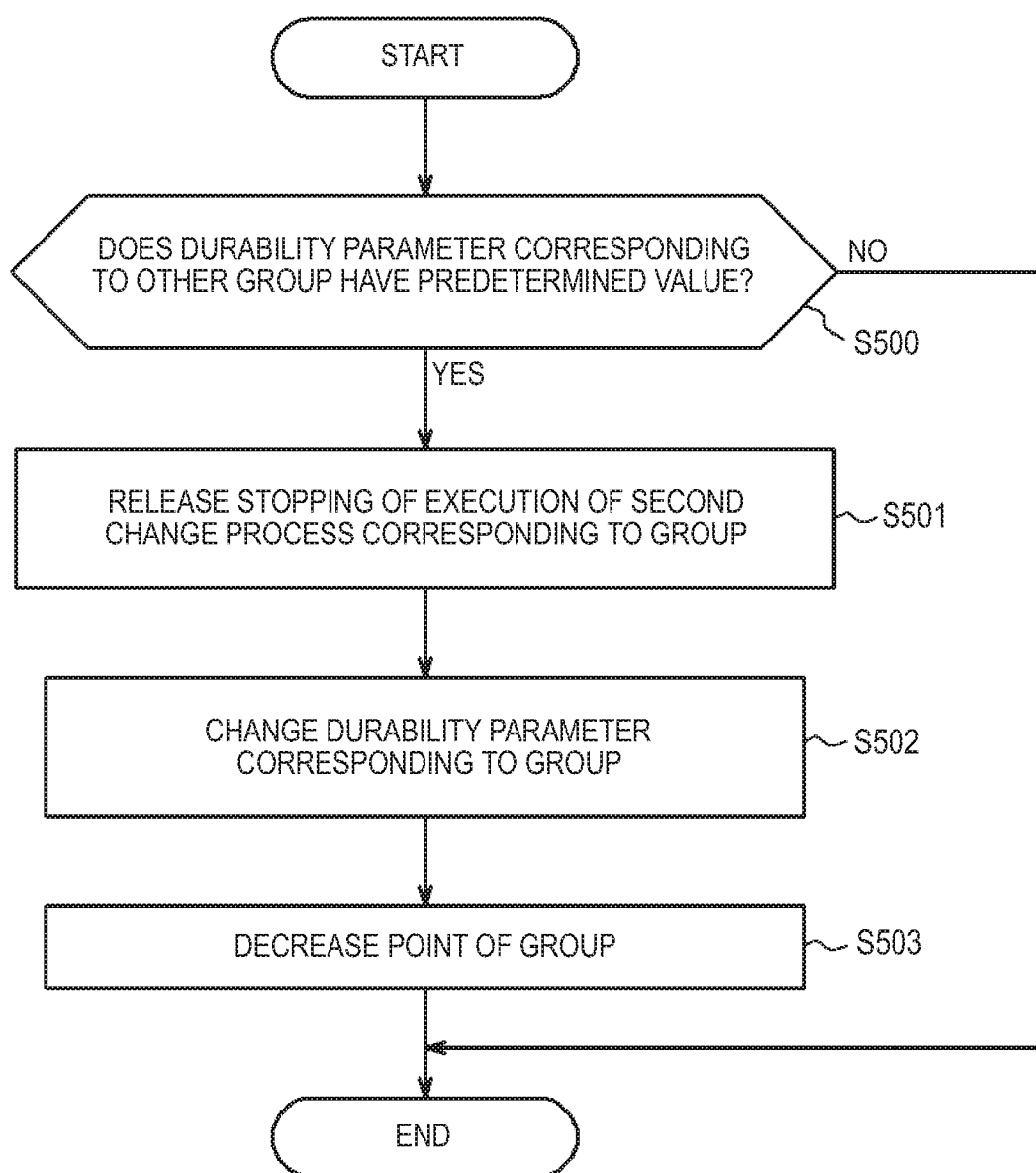

PROGRAM, INFORMATION PROCESSING APPARATUS, AND CONTROL METHOD FOR PROVIDING A STRATEGIC BATTLE GAME

CROSS-REFERENCE TO RELATED APPLICATIONS

This application claims priority from U.S. patent application Ser. No. 15/843,447, filed on Dec. 15, 2017, entitled "PROGRAM, INFORMATION PROCESSING APPARATUS, AND CONTROL METHOD FOR PROVIDING A STRATEGIC BATTLE GAME," which in turn claims priority to Japanese Patent Application No. JP2017-020320, filed on Feb. 7, 2017, and Japanese Patent Application No. JP2017-118022, filed on Jun. 15, 2017, the entire contents of which are hereby incorporated by reference.

FIELD

Exemplary embodiments described herein relate to a program, an information processing apparatus, and a control method.

BACKGROUND

In the related art, in a game executed by an information processing apparatus, a multi-play technique for advancing a game in response to operations by a plurality of users may be known. For example, Japanese Patent No. 5,600,205 discloses a multi-player game where a plurality of users divided into a plurality of groups play a battle against each other.

In the related art, improvement of a level of strategy that may be employed in a multi-player game may be desired. By improving the level of strategy that can be used in the multi-player game, for example, motivation for playing a game can be given to a plurality of users.

SUMMARY

An exemplary embodiment made in view of such circumstances may be may provide a program, an information processing apparatus, and a control method for improving a strategy of a game of a multi-player game.

According to an exemplary embodiment, there may be provided a program which may cause an information processing apparatus capable of communicating with a plurality of terminal devices used by a plurality of respective users to execute steps of: associating any one of a plurality of groups with each of a plurality of game media corresponding to a plurality of the respective users; arranging the plurality of game media on a field partitioned into a plurality of regions; starting a battle among the plurality of groups; arranging a first object associated with a plurality of parameters corresponding to a plurality of the respective groups on the field according to a progress situation of the battle; executing a first change process of changing a parameter corresponding to a group of the game medium among the plurality of parameters of the first object according to a control process of the game medium having a predetermined positional relationship with the first object on the field; stopping the executing of the first change process of the plurality of parameters if any one of the plurality of parameters of the first object reaches a predetermined value; increasing points of the group corresponding to the one parameter that has reached the predetermined value; and determining a result of the battle on the basis of a comparison of the points of each of the plurality of groups.

In addition, according to another exemplary embodiment, there may be provided an information processing apparatus including: a communication unit capable of communicating with a plurality of terminal devices used by a plurality of respective users; and a control unit, wherein the control unit is configured to execute: associating any one of a plurality of groups with each of a plurality of game media corresponding to a plurality of the respective users; arranging the plurality of game media on a field partitioned into a plurality of regions; starting a battle among the plurality of groups; arranging a first object associated with a plurality of parameters corresponding to a plurality of the respective groups on the field according to a progress situation of the battle; executing a first change process of changing a parameter corresponding to a group of the game medium among the plurality of parameters of the first object according to a control process of the game medium having a predetermined positional relationship with the first object on the field; stopping the executing of the first change process of the plurality of parameters if any one of the plurality of parameters of the first object reaches a predetermined value; increasing points of the group corresponding to the one parameter that has reached the predetermined value; and determining a result of the battle on the basis of a comparison of the points of each of the plurality of groups.

In addition, according to still another exemplary embodiment, there may be provided a control method of an information processing apparatus including a communication unit capable of communicating with a plurality of terminal devices used by a plurality of respective users and a control unit, the control method comprising steps which may be performed by the control unit, including: associating any one of a plurality of groups with each of a plurality of game media corresponding to a plurality of the respective users; arranging the plurality of game media on a field partitioned into a plurality of regions; starting a battle among the plurality of groups; arranging a first object associated with a plurality of parameters corresponding to a plurality of the respective groups on the field according to a progress situation of the battle; executing a first change process of changing a parameter corresponding to a group of the game medium among the plurality of parameters of the first object according to a control process of the game medium having a predetermined positional relationship with the first object on the field; stopping the executing of the first change process of the plurality of parameters if any one of the plurality of parameters of the first object reaches a predetermined value; increasing points of the group corresponding to the one parameter that has reached the predetermined value; and determining a result of the battle on the basis of a comparison of the points of each of the plurality of groups.

According to a program, an information processing apparatus, and a control method according to the invention, the strategy of a multi-player game may be improved.

BRIEF DESCRIPTION OF THE DRAWINGS

FIG. 2 is a diagram illustrating an example of information on a user;

FIG. 3 is a diagram illustrating an example of information on a group;

FIG. 4 is a diagram illustrating an example of information on an object;

FIG. 12 is a diagram illustrating Example 5 of the operations of the server apparatus.

DETAILED DESCRIPTION

Figure 1:
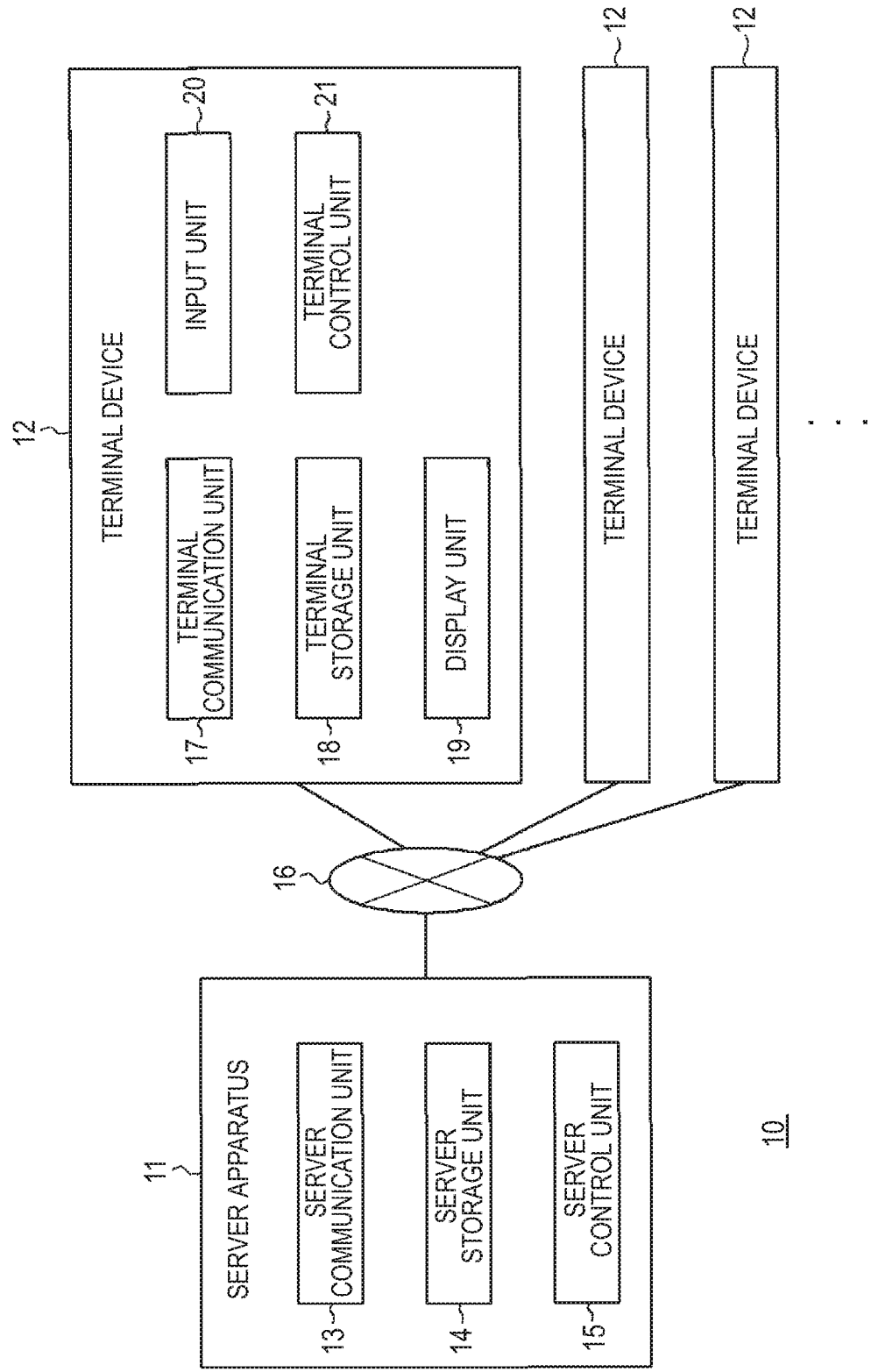
FIG. 1 is a block diagram of a game system according to an exemplary embodiment.

Hereinafter, exemplary embodiments of the invention may be described.

(Game System)

A game system 10 according to an exemplary embodiment may be described with reference to FIG. 1. The game system 10 may be configured to include a server apparatus 11 and a plurality of terminal devices 12. Three terminal devices 12 may be illustrated in FIG. 1 for the sake of convenience, but the number of terminal devices 12 may be two or more.

The server apparatus 11 may be, for example, an information processing apparatus such as a server that may be managed by a game manager. The terminal device 12 may be an information processing apparatus used by a user such as a mobile phone, a smartphone, a tablet terminal, a PC (Personal Computer), a game device, or the like. The server apparatus 11 and the terminal device 12 may be, for example, communicably connected via a network 16 such as the Internet. For example, the server apparatus 11 and the terminal device 12 may cooperatively execute various processes related to a game.

(Outline of Game)

The outline of the game according to the embodiment may be described. The game according to the embodiment may be a game performed by using a game medium.

The game medium may be electronic data that may be used for a game, and the game medium may include, for example, an arbitrary medium such as a card, an item, a virtual coin, a ticket, a character, a unit, and an avatar. In addition, the game medium may be electronic data that can be acquired, owned, used, managed, exchanged, combined, strengthened, sold, discarded, donated, or the like in the game by the user, but the usage of the game medium may not be limited to that specified in this specification.

Hereinafter, unless otherwise stated, a "game medium owned by a user" denotes a game medium associated with a user ID uniquely identifying the user as an owned game medium. Moreover, the phrase "assigning a game medium to a user" denotes associating a game medium with a user ID as an owned game medium. In addition, the phrase "discarding a game medium owned by a user" denotes canceling association between a user ID and an owned game medium. In addition, the phrase "consuming a game medium owned by a user" denotes generating some effect or influence in a game according to cancellation of association between a user ID and an owned game medium. In addition, the phrase "selling a game medium owned by a user" denotes canceling association between a user ID and an owned game medium and associating another game medium (for example, a virtual coin or an item, or the like) with the user ID as an owned game medium. In addition, the phrase "transferring a game medium owned by a user A to a user B" denotes canceling association between a user ID of a user A and an owned game medium and to associate the game medium with a user ID of a user B as an owned game medium. In addition, "generating a game medium" denotes defining or determining at least a portion of information on a game medium. Details of information on a game medium may be described later.

The game according to the embodiment may be a battle game having two battle modes: a regular battle and a group battle. The regular battle may be a battle mode where a user acquires a game medium, an in-game item, and the like by playing a battle against an opponent or completing a task such as a mission or a quest in the game by using a game medium (for example, a card) owned by a user. In addition, in the regular battle, a user may cooperate with other users to play a battle against a boss character of an enemy. The group battle may be a real-time battle mode for a plurality of players where one game medium (for example, a unit) configured with one or more game media (for example, cards) owned by a user may be arranged in a two-dimensional field in the game and the user may manipulate the unit to perform an action such as movement or attack to play a battle against units operated by each of a plurality of users.

In the battle game, the group battle may be implemented, for example, as a time-limited event. In the group battle, each unit may belong to one of three groups, and the winning or losing may be determined in units of a group. The group to which a user may belong may be selected by the user belonging to the group or may be automatically selected on the server side on the basis of a status of the user or an owned card. The group battle may end at the time when a predetermined time (for example, 30 minutes) has elapsed from the start of the battle. The user can allow the unit to act once for a predetermined time (for example, 5 seconds). For this reason, the number of times that an action can be performed by a unit in the group battle may be limited. The timing of allowing the unit to act may be the same for all the units participating in the group battle. The unit can perform any one of, for example, movement and attack in a single action. The user may acquire points by attacking units of other groups or by conquering bases located on the field. The base may have a durability parameter and may be conquered by the group that decreases the durability parameter of the base down to a predetermined value (zero), for example, by unit attack. A plurality of the bases may be arranged on the field.

Then, the winning and losing in the group battle and the in-game media and item to be given as a reward may be determined according to the points earned until the end of the battle. In addition, the user can acquire the in-game medium and items arranged on the field, for example, by allowing the unit to acquire the in-game medium and items. The in-game media, items, and the like acquired by the user in the group battle may be used not only in the group battle but also in the regular battle. Hereinafter, the group battle may also be simply referred to as battle.

(Server Apparatus)

A configuration of the server apparatus 11 may be specifically described. The server apparatus 11 may be configured to include a server communication unit 13, a server storage unit 14, and a server control unit 15.

The server communication unit 13 may include an interface that communicates with an external device by wireless or wired communication and performs transmission and reception of information. For example, the server communication unit 13 may include a wireless LAN (Local Area Network) communication module, a wired LAN communication module, or the like. The server communication unit 13 can transmit and receive information to and from the terminal device 12 via a network 16.

The server storage unit 14 may include, for example, a primary storage device and a secondary storage device. For example, the server storage unit 14 may include a semiconductor memory, a magnetic memory, an optical memory, or the like. The server storage unit 14 may store various types of information and programs necessary for providing and controlling a game. At least a portion of the information and the programs stored in the server storage unit 14 may be shared and synchronized with the terminal device 12. Hereinafter, an example of information stored in the server storage unit 14 may be specifically described.

(Information on User)

The server storage unit 14 may store information on a plurality of users. FIG. 2 illustrates information on each of two users. The information on the user may include various types of information unique to the user. For example, the information on the user may include a user ID, a group ID, information on an owned game medium, and information on an in-use game medium.

The user ID may be information capable of uniquely identifying the user. Hereinafter, the user ID may also be simply referred to as a user.

The group ID may be information indicating a group to which a user may belong. In the embodiment, there may be three groups A to C, but there may be two or more groups. Hereinafter, the group ID may also be simply referred to as a group.

The information on an owned game medium may include various types of information unique to a game medium (owned game medium) owned by a user in a game. In a case where the game medium is acquired by the user, the game medium may be associated with the user as the owned game medium. The information on the game medium may include a plurality of game parameters described later.

The information on an in-use game medium may be information indicating a game medium (in-use game medium) to be used by a user in a battle content. The in-use game medium may be selected from among owned game media. Therefore, one game medium may be an in-use game medium as well as an owned game medium. Hereinafter, the in-use game medium may also be referred to as a unit.

(Information on Group)

The server storage unit 14 may store information on a plurality of groups playing a battle against each other. FIG. 3 illustrates information on three groups A to C which may play a battle against each other. For example, the information on a group may include a group ID of the group, a user ID of a user belonging to the group, and information on an in-use game medium of the user. The information on a game medium may include a game medium ID, a level, a physical strength, an attack power, a defense power, a movement range, an attack range, a type, and information on a game function.

The game medium ID may be information capable of uniquely identifying a game medium. The game medium ID may be stored in the server storage unit 14 in advance. Alternatively, the game medium ID may be determined by the server apparatus 11 when the user acquires the game medium.

The level may be information indicating a degree of growth of a game medium. For example, the greater the value of the level, the greater the degree of growth of the game medium. In the embodiment, the value of the level may increase according to the playing of the game by the user.

The physical strength may be a parameter used for determining, for example, a state of a game medium during the battle. For example, the physical strength of a game medium may be reduced by an attack from another game medium. If the physical strength of the game medium decreases down to a predetermined value (zero), the game medium may be, for example, in a state of being unable to act during the battle. The larger the value of the physical strength of the game medium, the more advantageous it may be for the user. The physical strength may increase as the level increases.

The attack power may be a parameter that contributes to, for example, an amount of damage to be given to a target such as another game medium and an object arranged on the field by an attack from the game medium. The greater the value of the attack power, the greater the amount of damage to the target. The greater the attack power of the game medium, the more advantageous it may be for the user. The attack power may increase as the level increases.

The defense power may be a parameter that contributes to, for example, an amount of damage given to a game medium by an attack or the like from another game medium. The greater the value of the defense power, the smaller the amount of damage given to the game medium. The greater the defense power of the game medium, the more advantageous it may be for the user. The defense strength may increase as the level increases.

The moving distance may be a parameter indicating the number of cells that a unit arranged on a field in a game partitioned into a plurality of cells(regions) can move in one movement action. The longer the moving distance is, the longer the distance in which the game medium may be able to move in one movement action. The greater the moving distance of the game medium, the more advantageous it may be for the user. The moving distance may be determined according to, for example, the type of the game medium.

The attack distance may be a parameter indicating the number of cells which an attack of a unit arranged on the field can reach. The greater the attack distance, the longer the distance in which the game media can attack. The larger the attack distance of the game medium, the more advantageous it may be for the user. The attack distance may be determined according to, for example, the type of the game medium.

The type may be information indicating a type of a game medium. In the embodiment, for example, there may be three types, "infantry", "archer", and "cavalry", but there may be any number of types. As described above, the moving distance and attack distance of the game medium may be determined according to the type. For example, the "infantry" may have a moving distance of two cells and an attack distance of one cell. The "archer" may have a moving distance of two cells and an attack distance of three cells. The "cavalry" may have a moving distance of three cells and an attack distance of two cells.

The information on a game function may include various types of information unique to the game function associated with the game medium. An arbitrary number of game functions may be associated with one game medium. For example, in a case where a fortress object described below is arranged on the field, there may be a game function for temporarily or continuously generating a first game effect. For example, the first game effect may include an effect (advantageous effect) by which a user or group of a game medium may have an advantage in a battle. The advantageous effect may include, for example, an effect of increasing a statistic of a game medium, such as a physical strength, an attack power, or a defense power of the game medium. In addition, for example, in a case where a fortress object and a game medium, which may be described later, may have a predetermined positional relationship, there may be a game function of generating the first game effect. For example, the predetermined positional relationship may include a positional relationship in which a region where the fortress object may be located and a region where the in-use game medium may be located are adjacent to each other.

(Information on Object)

The server storage unit 14 may store information on objects that can be arranged on the field in the battle. FIG. 4 illustrates information on each of two objects. The information on an object may include various types of information unique to the object. For example, the information on an object may include an object ID, a durability parameter, acquired points, and a type.

The object ID may be information capable of uniquely identifying an object. Hereinafter, the object ID may also be simply referred to as an object.

The durability parameter may be a parameter used for processes related to object conquering. A plurality of durability parameters corresponding to a plurality of respective groups may be associated with one object. In the example illustrated in FIG. 4, three durability parameters corresponding to three groups A to C may be associated with one object. For example, if a unit attacks an object, the durability parameters corresponding to that groups of the unit decreases. If the durability parameter has a predetermined value (for example, zero), the object may be conquered by the group corresponding to the durability parameter.

The acquired points may indicate points given to a group that has conquered an object. In a case where an object has been conquered, the points of the group that has conquered the object may increase by the acquired points.

The type may be information indicating a type of an object. In the embodiment, there may be two types, "base" and "fortress", but there may be any number of types. Hereinafter, an object having a type of "base" may also be referred to as a base object (second object). An object having a type of "fortress" may also be referred to as a fortress object (first object). The processes on the objects may be different according to the types. As an outline, even after a base object is conquered to a group, the base object may be conquered by another group. On the other hand, after a fortress object is conquered by a group, the fortress object may not be conquered by another group. Details of the processes related to the object may be described later.

The server control unit 15 illustrated in FIG. 1 may be configured to include at least one processor among one or more general-purpose processors that may realize specific functions by reading a specific program and one or more dedicated processors specialized for specific processing. The server control unit 15 may control operations of the server apparatus 11 as a whole. The server control unit 15 may cooperate with the plurality of terminal devices 12 to execute various processes related to the game. An example of the operations of the server control unit 15 may be specifically described below.

The server control unit 15 may determine a plurality of users who may participate in a battle. For example, upon receiving the participation request for participating in the battle from the terminal device 12, the server control unit 15 may allow the user of the terminal device 12 to participate in the battle. The server control unit 15 may associate the group ID with the in-use game medium of each user participating in the battle and may add the group ID to the information on the group. The server control unit 15 may receive the participation request for participating in the battle until the number of users belonging to each group playing the battle becomes a predetermined upper limit number. The server control unit 15 of the user may receive the participation request for participating in the battle even after the battle may have started.

The server control unit 15 may arrange the in-use game medium of each user participating in the battle on a virtual field in the game. The server control unit 15 may arrange each in-use game medium at an arbitrary position on the field.

Figure 5:
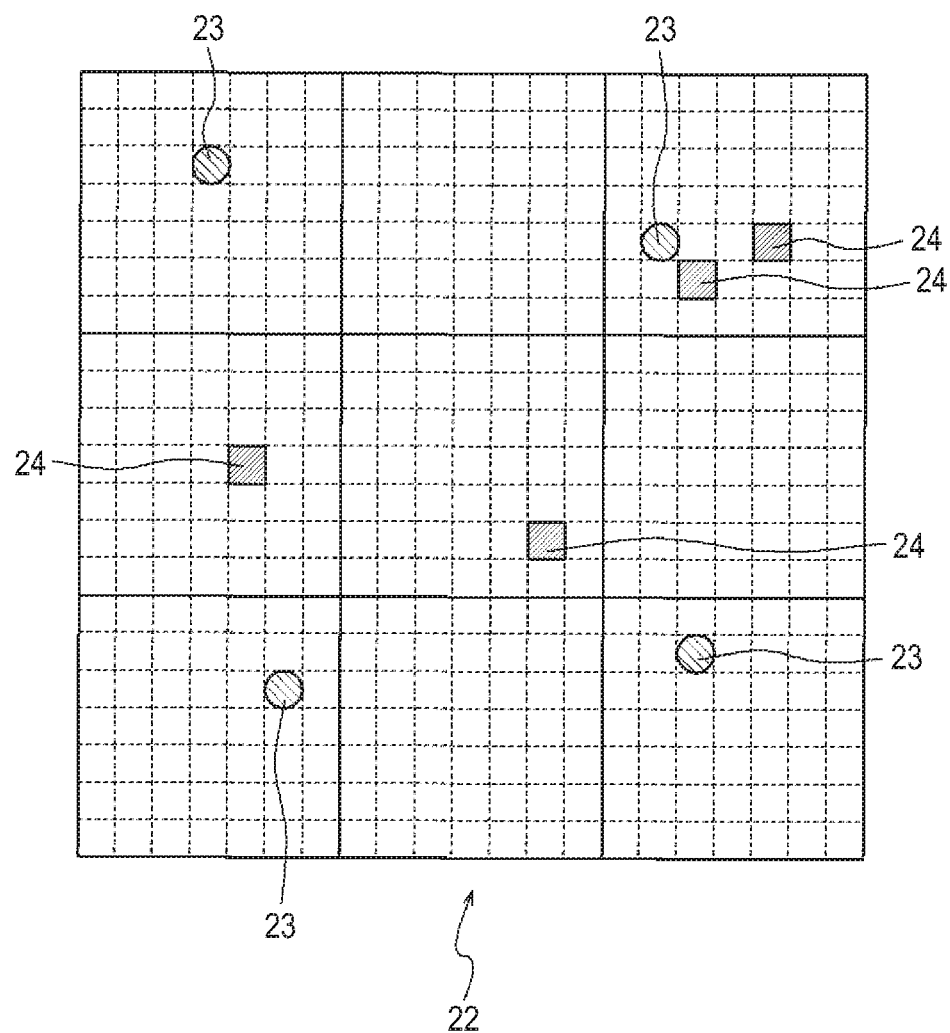
FIG. 5 is a diagram illustrating an example of fields in a game.

The field 22 may be described with reference to FIG. 5. The field 22 may be a two-dimensional field partitioned into, for example, 21×21=441 cells (regions), but the shape of the field 22 may be arbitrarily determined. For example, a three-dimensional field may be adopted as the field 22.

In addition to each in-use game medium, one or more base objects 23 may be arranged on the field 22. Four base objects 23 may be arranged on the field 22 illustrated in FIG. 5. The position of each base object 23 on the field 22 may be determined in advance or may be determined at random each time a battle is performed.

The plurality of regions included in the field 22 may include one or more candidate regions 24. Four candidate regions 24 may be included in the field 22 illustrated in FIG. 5. As described later, after the battle has started, the fortress object can be arranged in the candidate region 24 according to the progress situation of the battle.

The server control unit 15 may start a battle among a plurality of groups. During the execution of the battle, the server control unit 15 may cooperate with the terminal device 12 of each user participating in the battle to execute various processes related to the battle. For example, the server control unit 15 may allow the terminal device 12 to display various screens related to the battle. Details of the processes related to the battle may be described later.

The server control unit 15 may determine whether or not a battle ending condition is satisfied. The battle ending condition may include, for example, a condition that a predetermined time has elapsed from the start of the battle. In a case where it is determined that the battle ending condition is satisfied, the server control unit 15 may determine a result of the battle, for example, based on a comparison of points of each group. For example, the server control unit 15 may determine that the group having the highest points wins. Then, the server control unit 15 may end the battle.

The operations of the server control unit 15 executing the processes related to the battle described above may be described. In a case where the progress situation of the battle satisfies one or more predetermined conditions, the server control unit 15 may arrange the fortress object on the field 22. The one or more conditions may include, for example, at least one of a condition that the elapsed time from the start of the battle has reached a predetermined value and a condition that a lottery with a predetermined probability was performed and a user won the lottery. The one or more conditions may not be limited to the example described above. For example, the one or more conditions may include, for example, at least one of a condition that the number of in-use game media on the field 22 becomes equal to or larger than a predetermined value or smaller than a predetermined value and a condition that the number of in-use game media having a physical strength that has reached a predetermined value (for example, zero) during the battle becomes equal to or larger than a predetermined value. In a case where there are a plurality of candidate regions 24 on the field 22, the server control unit 15 may select at least one of the plurality of candidate regions 24. The server control unit 15 may arrange the fortress object in the selected at least one candidate region 24.

In a case where the fortress object is arranged, the server control unit 15 may allow the first game effect to be generated for at least a portion of the plurality of in-use game medium arranged on the field 22. For example, the server control unit 15 may allow the first game effect to be generated on the in-use game medium with which the above-described specific game function may be associated.

In a case where a fortress object is arranged, the server control unit 15 may allow a second game effect different from the first game effect to be temporarily or continuously generated for each of the in-use game media having a predetermined positional relationship with the candidate region 24 in which the fortress object may not be arranged among the plurality of candidate regions 24. For example, the predetermined positional relationship may include a positional relationship in which the candidate region 24 where the fortress object is not arranged and the region where the in-use game medium is located may be adjacent to each other. For example, the second game effect may include an effect (disadvantage effect) by which a user or a group of an in-use game medium may have disadvantage in a battle. The disadvantage effect may include, for example, an effect of decreasing the game parameters such as a physical strength, an attack power, or a defense power of the in-use game medium.

For example, in response to a request from the terminal device 12, the server control unit 15 may execute a control process of the in-use game medium. By the control process, the in-use game medium may execute operations such as a movement and attack. The server control unit 15 may receive the request for each terminal device 12 once in a predetermined time (for example, 5 seconds).

For example, the server control unit 15 may allow the in-use game medium to attack the fortress object by executing the control process of the in-use game medium. In such a case, the server control unit 15 may execute a first change process of changing (for example, decreasing) the durability parameter corresponding to the group of the in-use game medium among the plural durability parameters A to C of the fortress object.

For example, if the durability parameter A of the fortress object reaches a predetermined value (for example, zero), the server control unit 15 may stop executing the first change process of the plurality of durability parameters A to C. By stopping the executing of the first change process, for example, the corresponding durability parameter may be controlled so as not to be changed. In addition, the server control unit 15 may increase the points of the group A by the acquired points of the fortress object.

For example, the server control unit 15 may allow the in-use game medium to attack the base object 23 by executing the control process of the in-use game medium. In such a case, the server control unit 15 may execute a second change process of changing (for example, decreasing) the durability parameter corresponding to the group of the in-use game medium among the plurality of durability parameters A to C of the base object 23.

For example, if the durability parameter A of the base object 23 reaches a predetermined value (for example, zero), the server control unit 15 may stop executing the second change process of the durability parameter A. In addition, the server control unit 15 may increase the points of the group A by the acquired points of the base object 23. In addition, the server control unit 15 may change the values of the other durability parameters B and C, respectively. In addition, the server control unit 15 may increase or decrease the amount of change in each of the durability parameters B and C when executing the second change process for each of the other durability parameters B and C.

When the durability parameter A of the base object 23 has reached the predetermined value and another durability parameter B or C reaches a predetermined value, the server control unit 15 may release the stopping of execution of the second change process of the durability parameter A. In addition, the server control unit 15 may change (for example, may increase) the durability parameter A. In addition, the server control unit 15 may decrease the points of the group A by the acquired points of the base object 23.

(Terminal Device)

A configuration of the terminal device 12 may be specifically described. As illustrated in FIG. 1, the terminal device 12 may be configured to include a terminal communication unit 17, a terminal storage unit 18, a display unit 19, an input unit 20, and a terminal control unit 21.

The terminal communication unit 17 may include an interface that communicates with an external device by wireless or wired communication and transmits and receives information. The terminal communication unit 17 may include a wireless communication module corresponding to a mobile communication standard such as LTE (Long Term Evolution) (registered trademark), a wireless LAN communication module, a wired LAN communication module, or the like. The terminal communication unit 17 can transmit and receive information to and from the server apparatus 11 via the network 16.

The terminal storage unit 18 may include, for example, a primary storage device and a secondary storage device. For example, the terminal storage unit 18 may include a semi-conductor memory, a magnetic memory, an optical memory, or the like. The terminal storage unit may store various types of information and programs necessary for the processing of a game received from the server apparatus 11. For example, the terminal storage unit 18 may store a portion or all of the above-described information on the user and the information on the group. For example, a portion or all of these types of information may be acquired from the server apparatus 11 by the terminal control unit 21.

The display unit 19 may include, for example, a display device such as a liquid crystal display or an organic EL display. The display unit 19 can display various screens.

The input unit 20 may include an arbitrary input interface that receives a user operation. The input interface may include, for example, physical keys, a pointing device such as a mouse, a touch panel integrally provided with the display unit 19, and the like.

The terminal control unit 21 may be configured to include at least one processor among one or more general-purpose processors that realize a specific function by reading a specific program and one or more dedicated processors specialized for specific processing. The terminal control unit 21 may control whole operations of the terminal device 12. The terminal control unit 21 may cooperate with the server apparatus 11 to execute various processes related to the game. Hereinafter, an example of operations of the terminal control unit 21 may be specifically described.

The terminal control unit 21 may perform transmission and reception of information through the terminal communication unit 17. For example, the terminal control unit 21 may receive information necessary for the processing of the game from the server apparatus 11. The terminal control unit 21 may store the information received from the server apparatus 11 in the terminal storage unit 18.

The terminal control unit 21 may activate an application of a game in response to an operation of the user. For example, the terminal control unit 21 may display various screens related to the game on the display unit 19 in response to an instruction from the server apparatus 11. For example, the terminal control unit 21 may display at least a portion of the field 22 illustrated in FIG. 5 on the screen.

The terminal control unit 21 may transmit to the server apparatus 11, for example, a request for allowing an in-use game medium to execute an operation such as movement or attack in response to a predetermined user operation during the execution of the battle. The server apparatus 11 having received the request may execute a control process of the in-use game medium.

Figure 6:
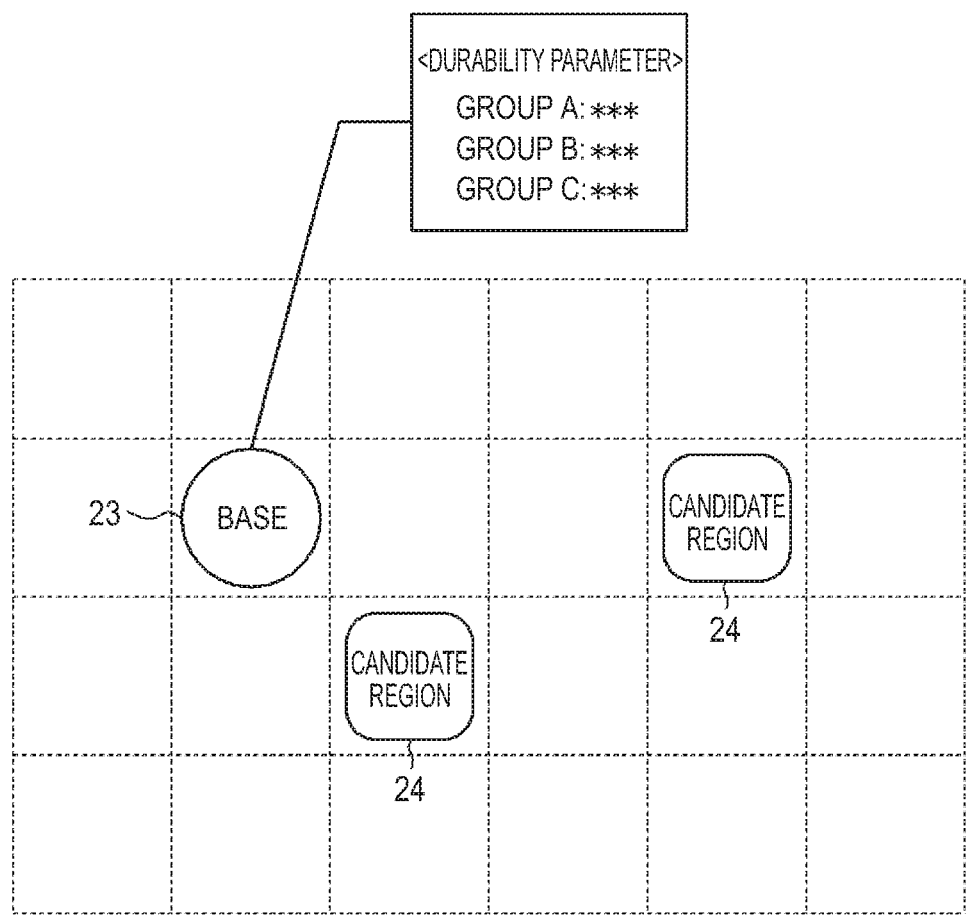
FIG. 6 is a diagram illustrating Example 1 of a portion of a game screen displayed on a terminal device.

FIG. 6 illustrates an example of a screen displaying a portion of the field 22 before a fortress object is arranged thereupon. One base object 23 and two candidate regions 24 may be displayed on the screen illustrated in FIG. 6. The terminal control unit 21 may allow the plurality of durability parameters of the base object 23 to be displayed on the screen.

Figure 7:
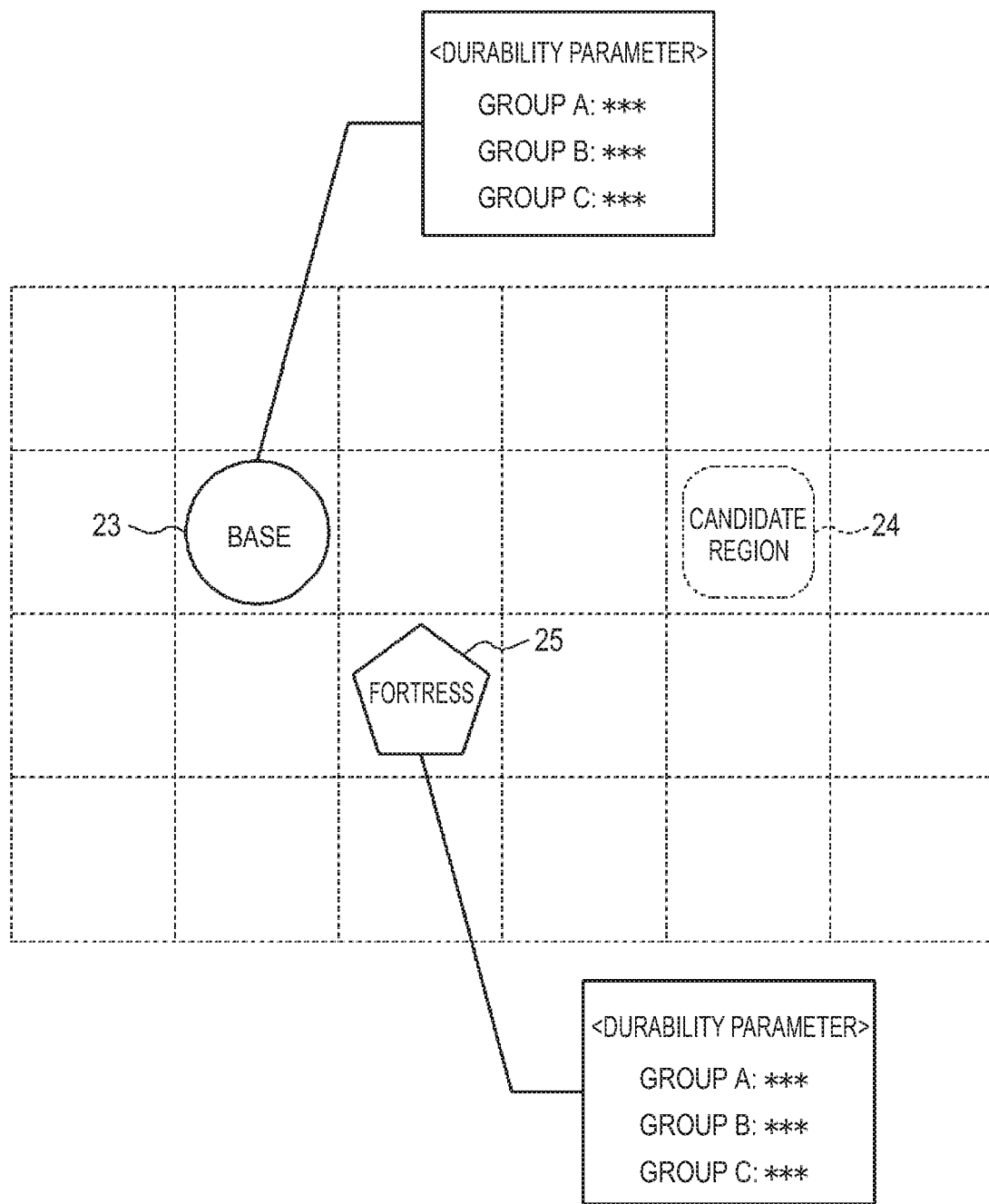
FIG. 7 is a diagram illustrating Example 2 of a portion of the game screen displayed on the terminal device.

FIG. 7 illustrates an example of a screen displaying a portion of the field 22 after the fortress object has been arranged. One base object 23, the fortress object 25 arranged in one candidate region 24, and one candidate region 24 in which the fortress object 25 is not arranged may be displayed on the screen illustrated in FIG. 7. The terminal control unit 21 may display a plurality of durability parameters of the base object 23 and a plurality of durability parameters of the fortress object 25 on the screen.

The terminal control unit 21 may change the display mode of the candidate region 24, for example, before and after the fortress object 25 may be arranged. For example, in a case where the fortress object 25 has been arranged, the terminal control unit 21 may display the candidate region 24 in which the fortress object 25 was not arranged in a manner different from a normal state, for example, by darkening or graying out the candidate region 24 or may allow the candidate region 24 to be non-displayed. In a case where the durability parameter change process is stopped as described above, the terminal control unit 21 may display the durability parameter in a mode different from a normal mode or may allow the durability parameter to be non-displayed.

Figure 8:
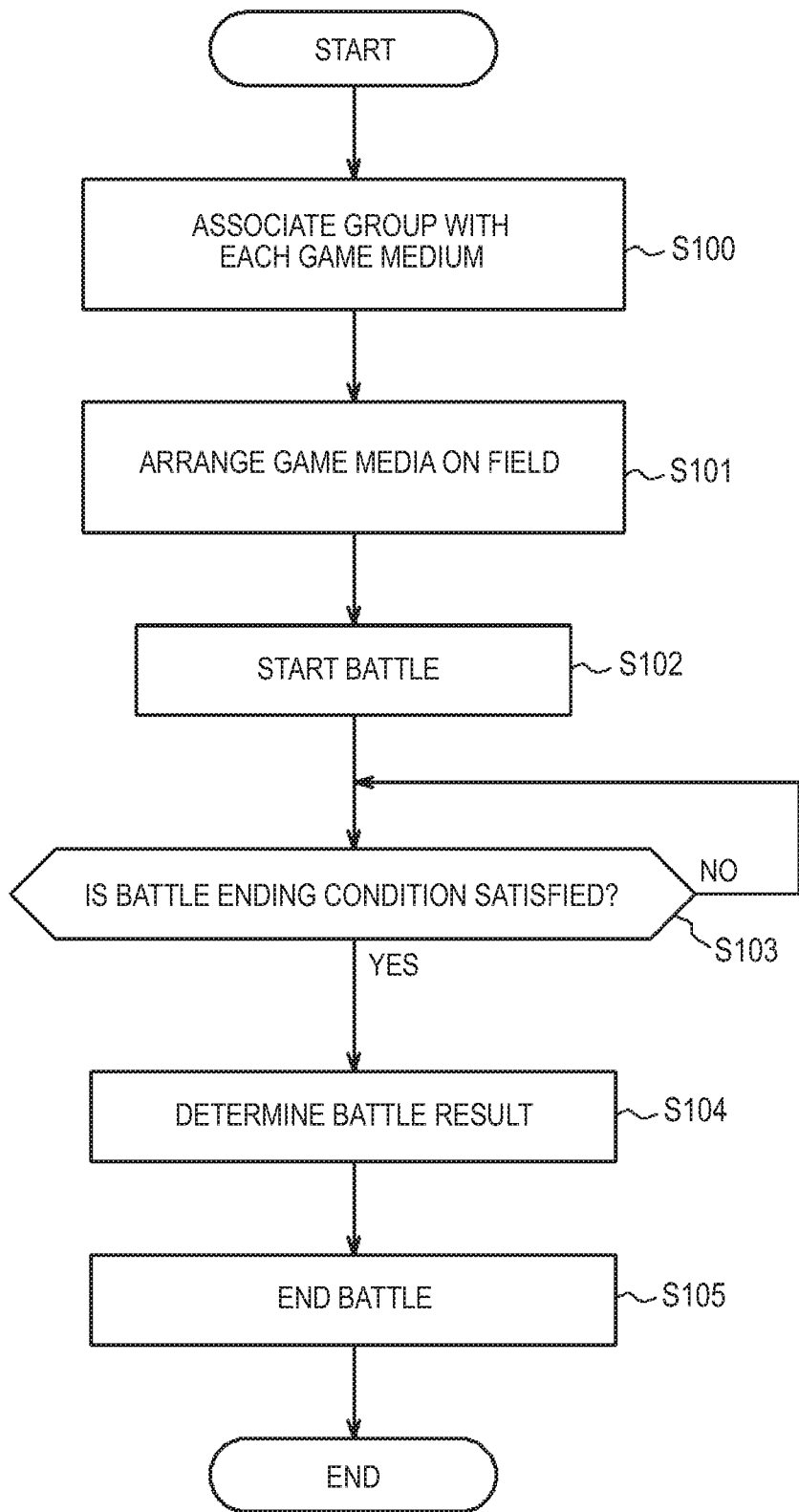
FIG. 8 is a diagram illustrating Example 1 of an operation of a server apparatus.

Example 1 of the operations of the server apparatus 11 may be described with reference to FIG. 8.

Step S100: The server control unit 15 may associate a group with an in-use game medium of each user participating in a battle.

Step S101: The server control unit 15 may arrange the in-use game medium of each user participating in the battle on the field 22.

Step S102: The server control unit 15 may start the battle among a plurality of groups.

Step S103: The server control unit 15 may determine whether or not the battle ending condition is satisfied. In a case where it is determined that the battle ending condition is satisfied (step S103: Yes), the process may proceed to step S104. On the other hand, in a case where it is determined that the battle ending condition is not satisfied (step S103: No), the server control unit 15 may repeat the step S103.

Step S104: In a case where it is determined that the battle ending condition is satisfied in step S103 (step S103: Yes), the server control unit 15 may determine the result of the battle.

Step S105: The server control unit 15 may end the battle.

Figure 9:
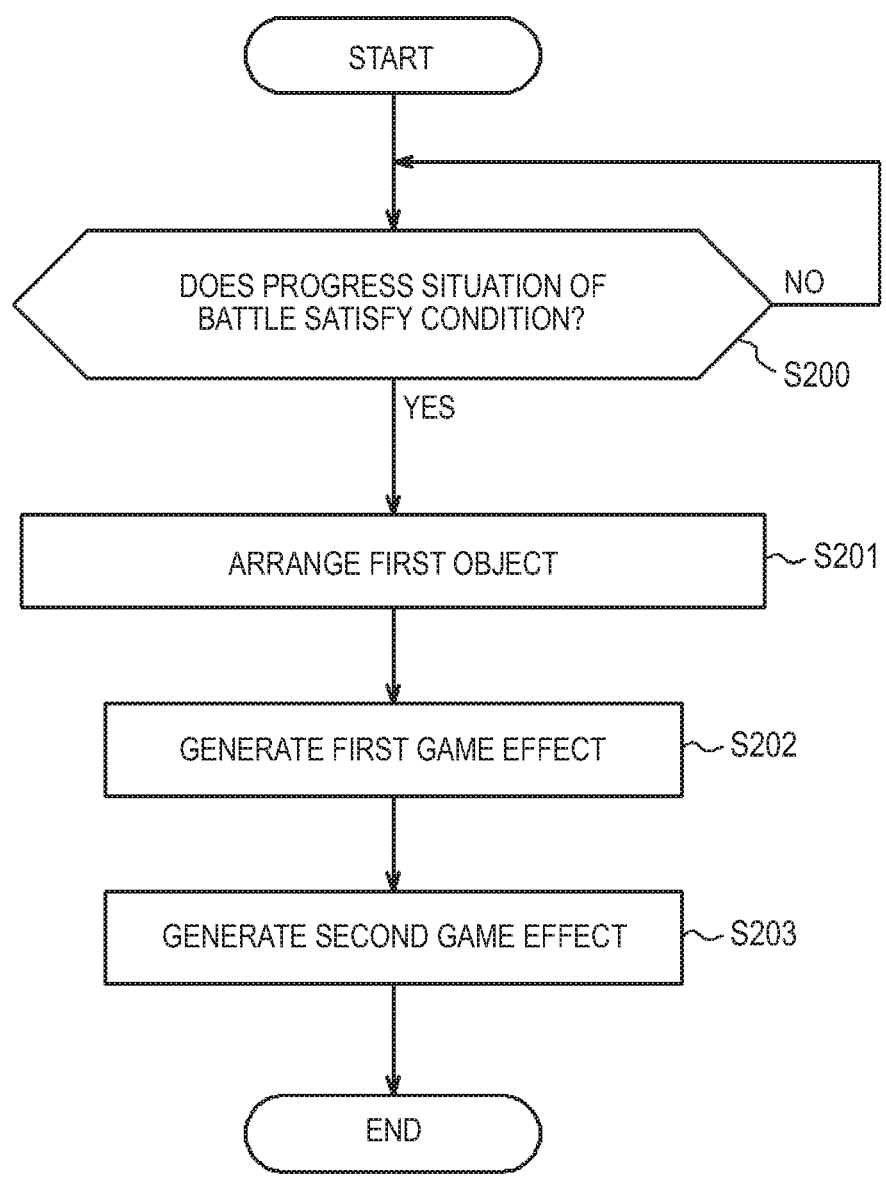
FIG. 9 is a diagram illustrating Example 2 of the operations of the server apparatus.

Example 2 of the operations of the server apparatus 11 may be described with reference to FIG. 9. The operations may be performed, for example, during the execution of the battle.

Step S200: The server control unit 15 may determine whether or not the progress situation of a battle satisfies at least one predetermined condition. In a case where it is determined that the progress situation of the battle satisfies the condition (step S200: Yes), the process may proceed to step S201. On the other hand, in a case where it is determined that the progress situation of the battle does not satisfy the condition (step S200: No), the server control unit 15 may repeat the step S200.

Step S201: In a case where it is determined that the progress situation of the battle satisfies the condition in step S200 (step S200: Yes), the server control unit 15 may arrange the fortress object 25 in each of at least one candidate region 24 on the field 22.

Step S202: The server control unit 15 may allow the first game effect to be generated for at least some of in-use game media among the plurality of in-use game media arranged on the field 22.

Step S203: The server control unit 15 may allow the second game effect to be generated for each of the in-use game media having a predetermined positional relationship with the candidate region 24 in which the fortress object 25 is not arranged among the plurality of candidate regions 24.

Figure 10:
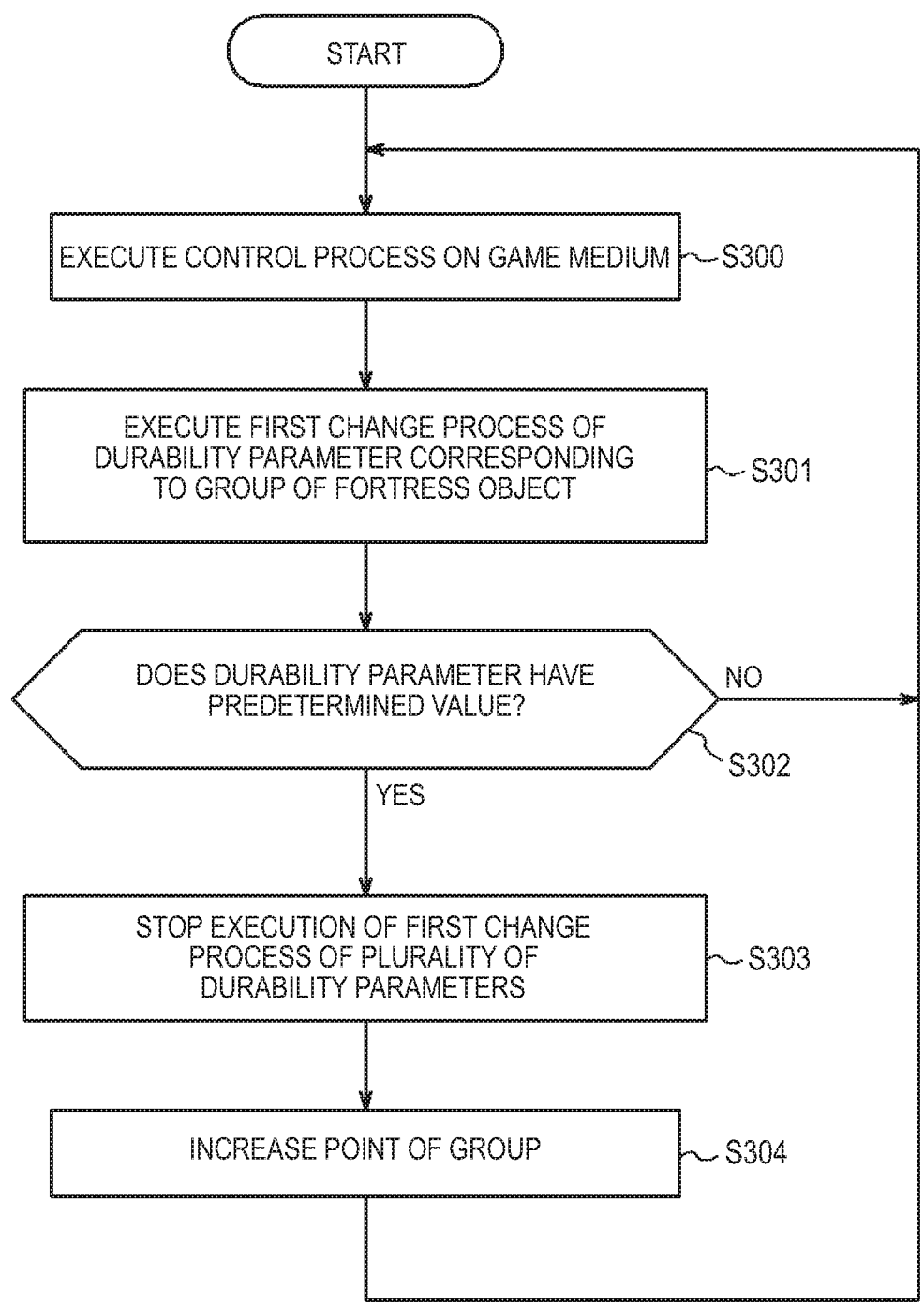
FIG. 10 is a diagram illustrating Example 3 of the operations of the server apparatus.

Example 3 of the operations of the server apparatus 11 may be described with reference to FIG. 10.

Step S300: The server control unit 15 may execute a control process of an in-use game medium, for example, in response to a request from the terminal device 12. For example, the server control unit 15 may execute the control process of the in-use game medium having a predetermined positional relationship with the fortress object 25 on the field 22. The predetermined positional relationship may be, for example, a positional relationship in which the distance (the number of regions) between the fortress object 25 and the in-use game medium may be equal to or smaller than an attack distance of the in-use game medium. For example, the in-use game medium may attack the fortress object 25 by the control process.

Step S301: The server control unit 15 may execute a first change process of changing a durability parameter of the fortress object 25 corresponding to the group of the in-use game media which has performed the attack. By the first change process, for example, the durability parameter may decrease. For example, in a case where the in-use game medium corresponding to the group A has performed the attack in step S300, the server control unit 15 may execute the first change process of the durability parameter A corresponding to the group A.

Step S302: The server control unit 15 may determine whether or not the durability parameter A changed in step S301 has reached a predetermined value. In a case where it is determined that the durability parameter A has reached the predetermined value (step S302: Yes), the process may proceed to step S303. On the other hand, in a case where it is determined that the durability parameter A has not reached the predetermined value (step S302: No), the process returns to step S300.

Step S303: In a case where it is determined that the durability parameter A has reached the predetermined value in step S302 (step S302: Yes), the server control unit 15 may stop executing the first change process of each of the plurality of durability parameters A to C of the fortress object 25.

Step S304: The server control unit 15 may increase the point of the group A corresponding to the durability parameter A determined to have reached the predetermined value in step S302.

Figure 11:
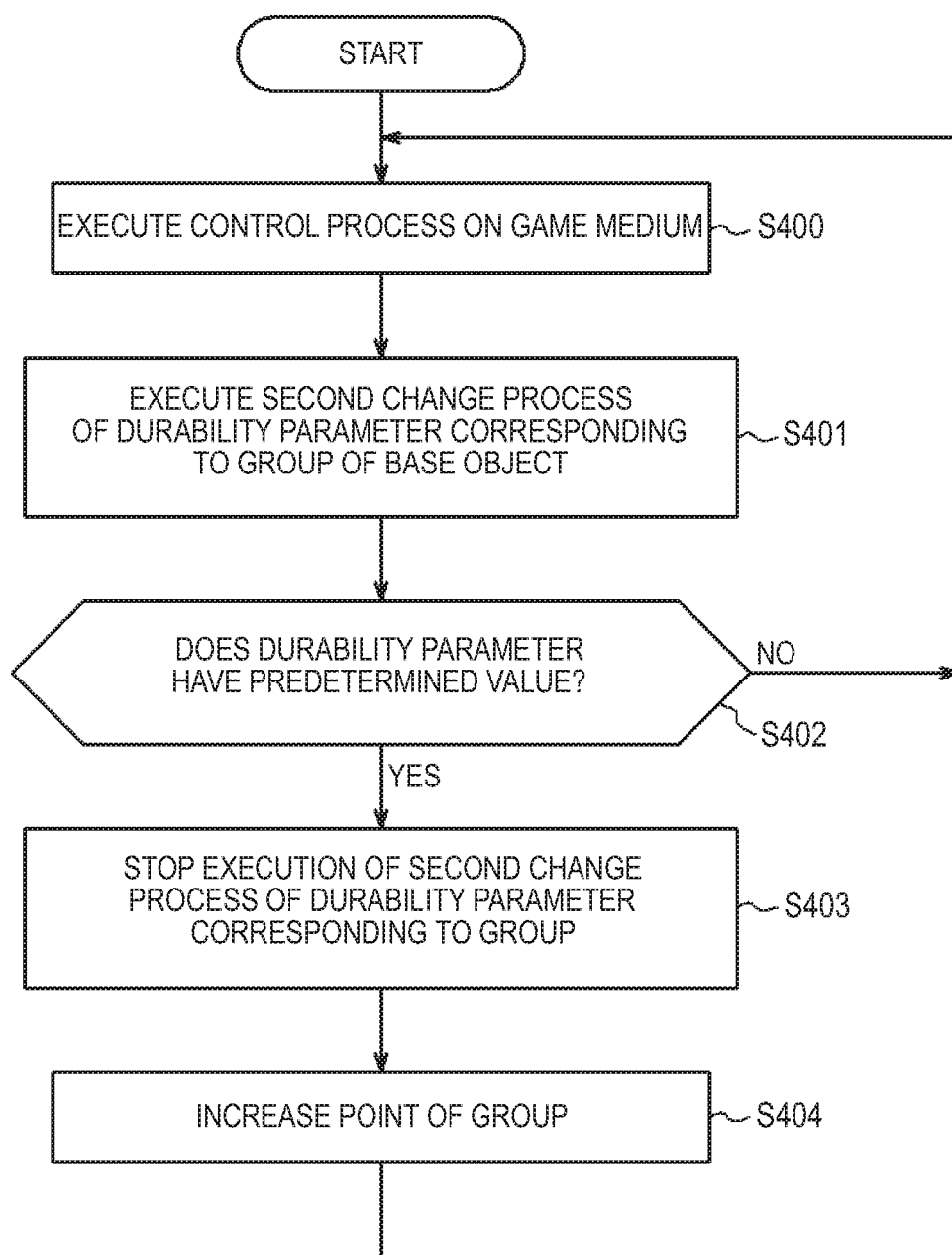
FIG. 11 is a diagram illustrating Example 4 of the operations of the server apparatus.

Example 4 of the operations of the server apparatus 11 may be described with reference to FIG. 11.

Step S400: The server control unit 15 may execute a control process of an in-use game medium, for example, in response to a request from the terminal device 12. For example, the server control unit 15 may execute the control process of the in-use game medium having a predetermined positional relationship with the base object 23 on the field 22. For example, the predetermined positional relationship may be a positional relationship in which the distance (the number of regions) between the base object 23 and the in-use game medium may be equal to or smaller than an attack distance of the in-use game medium. By the control process, for example, the in-use game medium may attack the base object 23.

Step S401: The server control unit 15 may execute a second change process of changing a durability parameter of the base object 23 corresponding to the group of in-use game media which has performed the attack. By the second change process, for example, the durability parameter may decrease. For example, in a case where the in-use game medium corresponding to the group A has performed the attack in step S400, the server control unit 15 may execute the second change process of the durability parameter A corresponding to the group A.

Step S402: The server control unit 15 may determine whether or not the durability parameter A changed in step S401 has reached a predetermined value. In a case where it is determined that the durability parameter A has reached the predetermined value (step S402: Yes), the process may proceed to step S403. On the other hand, in a case where it is determined that the durability parameter A has not reached the predetermined value (step S402: No), the process may return to step S400.

Step S403: In a case where it is determined in step S402 that the durability parameter A has reached the predetermined value (step S402: Yes), the server control unit 15 may stop executing the second change process of the durability parameter A of the base object 23.

Step S404: The server control unit 15 may increase the points of the group A based on the determination that the durability parameter A has reached the predetermined value in step S402.

Example 5 of the operations of the server apparatus 11 may be described with reference to FIG. 12. This operation may be performed in a case where it may be determined in step S402 that the durability parameter corresponding to one group has reached the predetermined value. Herein, a case where it may be determined that the durability parameter A corresponding to the group A has reached the predetermined value may be described.

Step S500: The server control unit 15 may determine whether or not the durability parameter B or C corresponding to another group B or C has reached a predetermined value. In a case where it is determined that the durability parameter B or C has reached the predetermined value (step S500: Yes), the process may proceed to step S501. On the other hand, in a case where it is determined that the durability parameter B or C has not reached the predetermined value (step S500: No), the process may end.

Step S501: In a case where it is determined in step S500 that the durability parameter B or C has reached the predetermined value (step S500: Yes), the server control unit 15 may stop executing the second change process of the durability parameter A corresponding to the group A.

Step S502: The server control unit 15 may change the durability parameter A corresponding to the group A. For example, the server control unit 15 may increase the durability parameter A from a predetermined value.

Step S503: The server control unit 15 may decrease the points of the group A.

As described above, the server apparatus 11 according to the embodiment may arrange the fortress object 25 on the field 22 according to the progress situation of the battle. When any one of the plurality of durability parameters of the fortress object 25 has reached a predetermined value, the server apparatus 11 may stop executing the first change process of the plurality of durability parameters. The server apparatus 11 may increase the points of the group corresponding to the durability parameter having reached the predetermined value. According to such a configuration, points may be given to the group which has first conquered the fortress object 25 that can be arranged during the battle. Therefore, in addition to a usual strategy of, for example, playing a battle between in-use game media, a strategy of conquering the fortress object 25 prior to the other groups may be formed. Therefore, the strategic elements of the multi-player game may be improved.

Although the invention has been described with reference to the drawings and the embodiments, it should be noted that those skilled in the art can easily make various changes and modifications on the basis of the present disclosure. Therefore, it should be noted that these changes and modifications may be within the scope of the invention. For example, functions and the like included in means, steps, or the like can be relocated so as not to be logically contradictory, and a plurality of the means, the steps, or the like may be combined into one or may be divided.

For example, in the above-described embodiment, the terminal device 12 may execute a portion or all of the operations and processes executed by the server apparatus 11. Similarly, the server apparatus 11 may execute a portion of the operations executed by the terminal device 12. For example, processes such as display control of various screens displayed on the terminal device 12 may be executed by either the server apparatus 11 or the terminal device 12, and the processes may be cooperatively executed by the server apparatus 11 and the terminal device 12. Alternatively, the game system 10 may not include the server apparatus 11. In such a case, the terminal device 12 may store the information received from the server apparatus 11 in the above-described embodiment in advance.

In the above-described embodiment, at least a portion of the screen displayed on the terminal device 12 may be displayed as a web display on the terminal device 12 on the basis of the data generated by the server apparatus 11, and at least a portion of the screen may be displayed as a native display by a native application installed in the terminal device 12. In this manner, the game according to the above-described embodiment can be a hybrid game in which each of the server apparatus 11 and the terminal device 12 covers a portion of the processes.

In addition, an information processing apparatus such as a computer or a cellular phone can be suitably used in order to allow the information processing apparatus to function as the server apparatus 11 or the terminal device 12 according to the embodiment described above. Such an information processing apparatus can be realized by storing, in a storage unit of the information processing apparatus, a program describing contents of processes for realizing functions of the server apparatus 11 or the terminal device 12 according to the embodiment and reading and executing the program by a CPU of the information processing apparatus.

In addition, in the above-described embodiment, in a case where the fortress object 25 and the game medium have a predetermined positional relationship and the game medium and another game medium satisfy a predetermined condition, the server control unit 15 of the server apparatus 11 may temporarily or continuously generate the first game effect or the second game effect on the game medium. The content of the first game effect or the second game effect may be the same as or different from the content of the first game effect or the second game effect in the above-described embodiment. The predetermined positional relationship may include a positional relationship in which a region where the fortress object 25 is located and a region where the game medium is located may be adjacent to each other. The predetermined condition may include, for example, a condition that the game medium may execute an action such as attack or recovery against another game medium, or a condition that another game medium may execute an action such as attack or recovery on the game medium. The predetermined condition may include that the game medium and another game medium have a predetermined positional relationship (for example, a positional relationship that one of the game medium and another game medium may be included within one attack distance of the other). According to such a configuration, opportunities to generate the first game effect or the second game effect on the game medium increase, so that the strategy of the game may be further improved.

As another condition that the first game effect or the second game effect may be generated, there may be a condition that a parameter of the game medium (for example, an attribute or a physical strength of the game medium) may have a predetermined value. Another condition may include a condition that one or more game media having the above positional relationship with the fortress object 25 (for example, a condition that a specific game medium is included in the one or more game media or a condition that the number of the one or more game medium is a predetermined number) satisfy a condition. According to such a configuration, since a new strategy may be formed in order to generate the first game effect or the second game effect on the game medium, the strategic elements of the game may be further improved.

In addition, in the above-described embodiment, the game function of generating the first game effect may have been described, but there may be a game function of generating the second game effect. For example, in a case where the fortress object 25 is arranged on the field 22, there may be a game function of generating the second game effect. In addition, for example, in a case where the fortress object 25 and the game medium have a predetermined positional relationship, there may be a game function of generating the second game effect. The predetermined positional relationship may include a positional relationship in which a region where the fortress object 25 is located and a region where the game medium is located may be adjacent to each other. According to such a configuration, since the game function may be diversified, the strategic elements of the game may be further improved.

In addition, a first game function of generating the first game effect and a second game function of generating the second game effect may be associated with one game medium. In such a case, a first condition for generating the first game effect and a second condition for generating the second game effect may be determined in advance. In a case where both of the first condition and the second condition are satisfied, only one of the first game effect and the second game effect may be preferentially generated. For example, in a case where both of the first condition and the second condition are satisfied, when the distance between the fortress object 25 and the game medium is within a first distance range, the first game effect may be generated, and when the distance is within a second distance range, the second game effect may be generated. For example, in a case where both of the first condition and the second condition are satisfied, when the parameter (for example, physical strength) of the game medium is equal to or larger than a predetermined value, the first game effect (or the second game effect) may be generated, and when the parameter is smaller than the predetermined value, the second game effect (or the first game effect) may be generated. For example, in a case where both of the first condition and the second condition are satisfied, when another game medium included within the attack distance of the game medium satisfies a predetermined condition, the first game effect (or the second game effect) may be generated, and when another game medium does not satisfy the predetermined condition, the second game effect (or the first game effect) may be generated, such that the second game effect (or first game effect) is applied to the game medium not subject to the first game effect (or second game effect). For example, in a case where both of the first condition and the second condition are satisfied, only one of the first game effect and the second game effect may be generated according to the positional relationship between the fortress object 25 and another game medium. According to such a configuration, opportunities for generation of the first game effect or the second game effect change quickly, so that the interest of the game may be improved.

Alternatively, in a case where both of the first condition and the second condition are satisfied, the first game effect and the second game effect may be generated at the same time, or alternatively may be generated at different times, with a time difference. In a case where the first game effect and the second game effect are generated at the same time, that is, applied cumulatively, at least a portion of the first game effect and at least a portion of the second game effect may be canceled out. For example, considered may be a case where the first game effect "attack power+ten points, defense power+five points" and the second game effect "attack power−nine points" may be generated at the same time for one game medium. In such a case, as a result of canceling out a portion of the first game effect and a portion of the second game effect, the attack power of the game medium may increase by one point, and the defense power may increase by five points.

In addition, in the above-described embodiment, the first change process of changing the durability parameter of the fortress object 25 in a case where the game medium is allowed to attack the fortress object 25 has been described. In the first change process, the server control unit 15 of the server apparatus 11 may increase or decrease the amount of change of the durability parameter according to the type of the game medium that may attack the fortress object 25. For example, in a case where the type of the game medium which may perform an attack is "cavalry", the server control unit 15 may increase the amount of change of the durability parameter. According to such a configuration, a specific type of game medium may have advantage or disadvantage for attacking the fortress object 25. Therefore, diversification of the type of game media used in one group may be facilitated, and the strategic elements of the multi-player game may be further improved.

In addition, in the above-described embodiment, exemplary configurations in which the fortress object 25 may be arranged on the field 22 in a case where the progress situation of the battle satisfies one or more predetermined conditions has been described. The one or more conditions may not be limited to the above-described embodiments, and any condition may be included. For example, the one or more conditions may include a condition that the elapsed time from the start of the battle becomes any one of a plurality of predetermined values different from each other. Specifically, in a case where the elapsed time from the start of the battle becomes any one of, for example, 0 minutes, 5 minutes, 15 minutes, 20 minutes, and 25 minutes, the server control unit 15 of the server apparatus 11 may arrange the fortress object 25 on the field 22.

What is claimed is:

1. A computer program product embodied on a non-transitory computer-readable medium and containing instructions that, when executed, cause an information processing apparatus configured to communicate with a plurality of terminal devices used by a plurality of respective users to execute steps of:
    starting a battle among a plurality of groups in a game field;
    arranging a first object on the field according to a progress situation of the battle, the first object being associated with a plurality of parameters, at least one parameter in the plurality of parameters corresponding to one of the plurality of groups;
    executing a first change process of changing a parameter among the plurality of parameters of the first object, the parameter corresponding to a group, according to a control process of a game medium of said group and present on the field;
    determining if any one of the plurality of parameters of the first object has reached a predetermined value, and when said any one of the plurality of parameters of the first object has reached said predetermined value, stopping the executing of the first change process of the plurality of parameters for the first object until a predetermined time in the game, and continuing the battle with the first change process in a stopped state;
    determining a group associated with the one parameter that has reached the predetermined value, and increasing a point value of that group; and
    determining the result of the battle based on a comparison of point values of each of the plurality of groups.

2. The computer program product according to claim 1, wherein the step of arranging of the first object is executed when an elapsed time of the battle has reached a predetermined value.

3. The computer program product according to claim 1, wherein the step of arranging the first object on the field comprises, after the step of starting the battle, determining if a progress situation of the battle satisfies one or more predetermined conditions, and, when the progress situation of the battle satisfies the one or more predetermined conditions, automatically arranging the first object on the field.

4. The computer program product according to claim 3, wherein the one or more predetermined conditions comprise one or more of: a condition that a user won an in-game lottery, a condition that a number of in-use game media on the field is less than, equal to, or greater than a predetermined value, and a condition that a number of in-use game media on the field have reached a predetermined strength score.

5. The computer program product according to claim 1, wherein, when the first object is arranged, the information processing apparatus further executes a step of generating a first game effect for one or more game media on the field.

6. The computer program product according to claim 5, wherein the step of generating the first game effect comprises determining when the one or more game media are in a predetermined positional relationship with the first object, and, when the one or more game media are in the predetermined positional relationship with the first object, generating the first game effect for those one or more game media.

7. The computer program product according to claim 5, wherein the first game effect comprises augmenting a statistic of the one or more game media used in the control process.

8. The computer program product according to claim 5, wherein, when the first object is arranged, the information processing apparatus further executes a step of generating a second game effect for the one or more game media on the field.

9. The computer program product according to claim 8, wherein the step of generating the first game effect comprises determining when the one or more game media are in a first predetermined positional relationship with the first object, and, when the one or more game media are in the first predetermined positional relationship with the first object, generating the first game effect for the one or more game media; and
    wherein the step of generating the second game effect comprises determining when the one or more game media are in a second predetermined positional relationship with the first object, and, when the one or more game media are in the second predetermined positional relationship with the first object, generating the second game effect for the one or more game media.

10. The computer program product according to claim 8, wherein the first game effect and second game effect are applied cumulatively to the one or more game media.

11. The computer program product according to claim 8, wherein the first game effect and second game effect are applied at different times to the one or more game media.

12. The computer program product according to claim 5, wherein, when the first object is arranged, the information processing apparatus further executes a step of generating a second game effect for one or more game media on the field not subject to the first game effect.

13. The computer program product according to claim 1, wherein a plurality of game media are arranged on the field, the plurality of game media having a plurality of predetermined types.

14. The computer program product according to claim 13, wherein a first game medium in the plurality of game media has a first predetermined type and a second game medium in the plurality of game media has a second predetermined type; and wherein a control process associated with the first game medium changes the parameter, in the first change process, based on an attack value of the first game medium, and wherein a control process associated with the second game medium changes the parameter, in the first change process, based on an attack value of the second game medium and based on the second predetermined type of the second game medium.

15. The computer program product according to claim 1, wherein one or more second objects are arranged on the field, the one or more second objects being associated with the plurality of parameters, at least one parameter in the plurality of parameters corresponding to one of the plurality of groups, and wherein the information processing apparatus further executes steps of:

executing a second change process of changing a second object parameter among the plurality of parameters of the second object, the second object parameter corresponding to a group, according to the control process;

determining if any one of the plurality of parameters of the second object has reached a second predetermined value, and when a first parameter in the plurality of parameters of the second object has reached said second predetermined value, stopping the executing of the second change process of the first parameter that has reached said second predetermined value for the second object until a second predetermined time in the game;

determining a first group associated with the first parameter that has reached the second predetermined value, and increasing the point value of the first group;

when a second parameter in the plurality of parameters of the second object reaches the second predetermined value after the first parameter has reached the second predetermined value, resuming execution of the second change process for the first parameter; and decreasing the point value of the first group.

16. The computer program product according to claim 15, wherein the information processing apparatus further executes a step of arranging the one or more second objects prior to a step of starting a battle among the plurality of groups.

17. The computer program product according to claim 15, wherein the information processing apparatus further executes a step of randomly arranging the one or more second objects on the field.

18. The computer program product according to claim 1, wherein the field is partitioned into a plurality of regions, the plurality of regions comprising a plurality of candidate regions, and wherein arranging the first object on the field comprises:

excluding a candidate region next to an in-use game medium from the plurality of candidate regions; and
arranging the first object in a remaining candidate region.

19. An information processing apparatus comprising:
a communication unit configured to communicate with a plurality of terminal devices used by a plurality of respective users; and a control unit,
wherein the control unit executes steps of:
starting a battle among a plurality of groups in a game field;

arranging a first object on the field according to a progress situation of the battle, the first object being associated with a plurality of parameters, at least one parameter in the plurality of parameters corresponding to one of the plurality of groups;

executing a first change process of changing a parameter among the plurality of parameters of the first object, the parameter corresponding to a group, according to a control process of a game medium of said group and present on the field;

determining if any one of the plurality of parameters of the first object has reached a predetermined value, and when said any one of the plurality of parameters of the first object has reached said predetermined value, stopping the executing of the first change process of the plurality of parameters for the first object until a predetermined time in the game, and continuing the battle with the first change process in a stopped state;

determining a group associated with the one parameter that has reached the predetermined value, and increasing a point value of that group; and determining the result of the battle based on a comparison of point values of each of the plurality of groups.

20. A method for controlling an information processing apparatus including a communication unit capable of communicating with a plurality of terminal devices used by a plurality of respective users and a control unit, the method comprising performing, with the control unit, the steps of:

starting a battle among a plurality of groups in a game field;

arranging a first object on the field according to a progress situation of the battle, the first object being associated with a plurality of parameters, at least one parameter in the plurality of parameters corresponding to one of the plurality of groups;

executing a first change process of changing a parameter among the plurality of parameters of the first object, the parameter corresponding to a group, according to a control process of a game medium of said group and present on the field;

determining if any one of the plurality of parameters of the first object has reached a predetermined value, and when said any one of the plurality of parameters of the first object has reached said predetermined value, stopping the executing of the first change process of the plurality of parameters for the first object until a predetermined time in the game, and continuing the battle with the first change process in a stopped state;

determining a group associated with the one parameter that has reached the predetermined value, and increasing a point value of that group; and determining the result of the battle based on a comparison of point values of each of the plurality of groups.

* * * * *